Patented May 20, 1924.

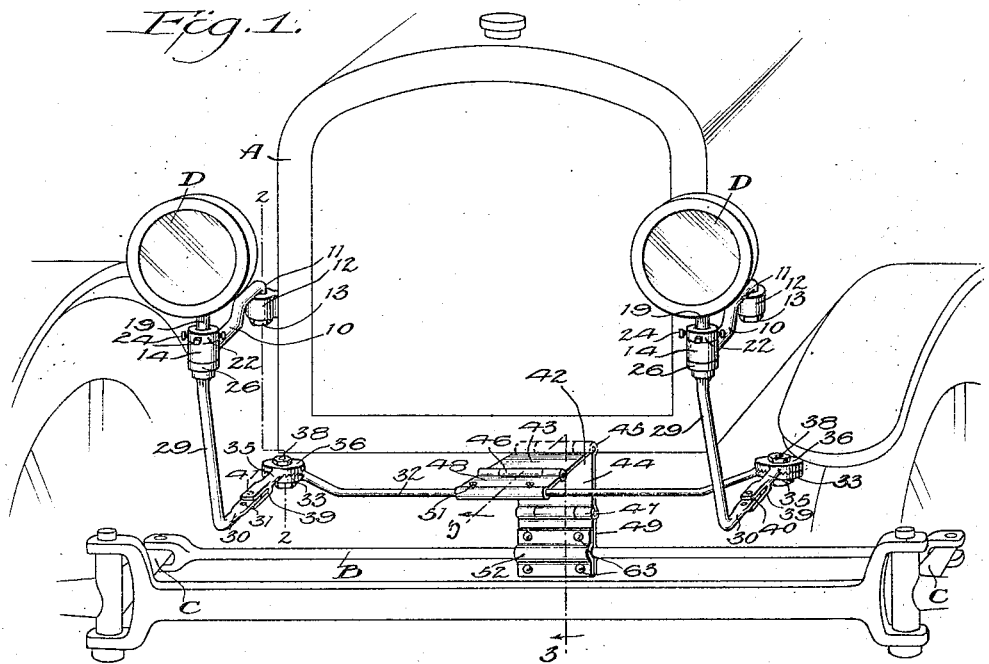

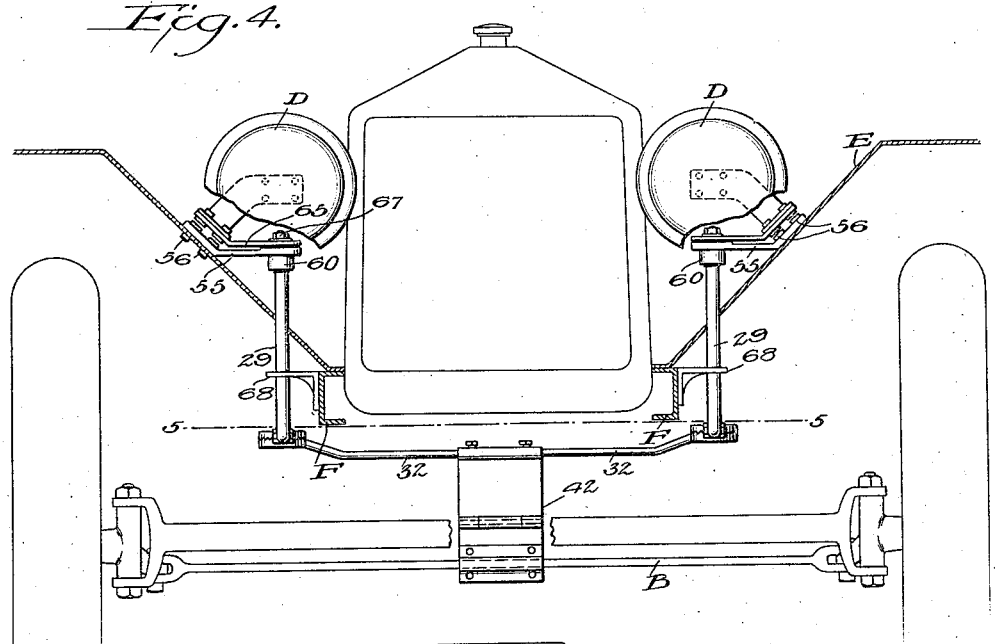
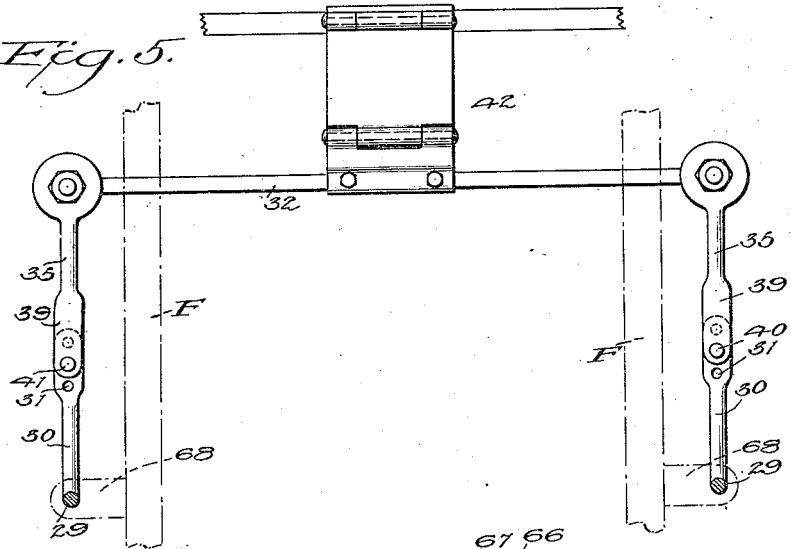

1,495,111

UNITED STATES PATENT OFFICE.

CHARLES G. ROESCHER, OF NEW BRITAIN, CONNECTICUT.

DIRIGIBLE HEADLIGHT.

Application filed September 7, 1922. Serial No. 586,732.

*To all whom it may concern:*

Be it known that I, CHARLES G. ROESCHER, a citizen of the United States, and a resident of New Britain, in the county of Hartford and State of Connecticut, have invented a new and Improved Dirigible Headlight, of which the following is a full, clear, and exact description.

This invention has relation to headlights for vehicles and has particular reference to a dirigible headlight for motor vehicles.

The invention contemplates a means for mounting and automatically effecting the turning of the headlights simultaneously with the turning of the vehicle in order to illuminate the roadway in advance of the vehicle upon making a turn.

The primary object of the invention is to provide a simple and inexpensive dirigible mounting for the headlights of a motor vehicle, which means is rendered applicable to practically all standard types of motor vehicles by the provision of adjustable features for this purpose.

As a further object the invention includes means for minimizing the transmission of vibration to the lamps, which vibration may be caused due to the connection between the lamps and the running gear.

As a still further object the invention contemplates a connection between the steering gear and the lamps which includes means for compensating for the relative movements between the steering gear and the body of the vehicle from which the lamps are supported.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a perspective view illustrating a dirigible headlight mounting constructed in accordance with the invention and applied to a motor vehicle.

Fig. 2 is an enlarged fragmentary detail sectional view through the mounting taken approximately on the line 2—2 of Fig. 1

Fig. 3 is a similar sectional view taken approximately on the line 3—3 of Fig. 1.

Fig. 4 is a front elevation of a slightly modified adaptation of the invention, parts being broken away and shown in section to disclose the underlying structure.

Fig. 5 is a fragmentary horizontal sectional view taken approximately on the line 5—5 of Fig. 4.

Fig. 6 is an enlarged detail fragmentary sectional view thereof.

Referring to the drawings by characters of reference, A designates the hood of a motor vehicle and B the tie rod which connects the steering knuckle arms C for effecting the steering of the vehicle through the ordinary well known form of steering gear. The dirigible mounting for the head lights D, which mounting constitutes the invention and as illustrated in the first form, consists of a pair of supporting arms 10 which are connected to and extend forwardly from the hood A, the mud guards or frame of the body at opposite sides thereof. Preferably the connection between the arms 10 and the hood consists in providing the rear ends of the arms with downturned threaded extremities 11 which are passed through eyes 12 attached to the hood, said threaded extremity after passing through the eyes having mounted thereon retaining nuts 13. The forward extremities of the arms 10 are provided with vertical bearing sleeves 14 within which heads 15 are swiveled for rotation. The heads 15 are provided with sockets 16 having reduced threaded lower ends 17 in which the reduced threaded extremities 18 of the lamp bracket shanks 19 are screwed. The lamp bracket shanks 19 are provided with an annular enlargement 20 having a peripheral groove 21 and a retaining ring 22 having a flange 23 at its lower end is mounted over the annular enlargement with the flange abutting the under side thereof. Screw bolts 24 are threaded through the sides of the ring with their inner ends extending into the groove 21 whereby the retaining ring 22 is circumferentially adjustably clamped to the lamp bracket shank. The heads 15 are exteriorly threaded as at 25 at a point below the lower end of the bearing sleeves 14 and have mounted thereover a nut 26, the upper end of which is provided with an enlarged socket 27. Coiled springs 28 are interposed between the lower end of the sleeves 14 and the nut 26, said springs surrounding the heads and interposed within the sockets 27, to cushion all shocks and to prevent vibration. A shaft 29 depends from each head 15 and each shaft is provided at its lower end with a rearwardly projecting terminal 30 having a plurality of vertical longitudinally spaced apertures 31.

From the foregoing it will be seen that a lamp mounting is afforded which upon turning of the shafts 29 effects a corresponding turning of the headlights D. A connecting rod 32 arranged in parallel spaced relation to the tie rod B is provided at its opposite ends with substantially circular heads 33 having radially disposed teeth or serrations 34 on its upper face. A pair of arms 35 each provided at its rear end with a circular head 36 having radially disposed teeth or serrations 37 engageable with the serrations or teeth 34 of the head 33 is provided and clamped to the heads 33 by a bolt 38. This construction admits of various relative angular adjustments of the arms to the connecting rod 32. The forward free ends of the arms 35 are bifurcated as at 39 and the furcations are provided with aligned apertures 40 which when registered with one of the apertures 31 in the terminal 30 are designed to receive a connecting bolt 41. This serves to connect the shafts 29 for simultaneous turning movement in the same direction when the connecting rod 32 is axially shifted. In order to synchronize the turning movement of the lamps D with the turning of the steering wheels of the vehicle, the connecting rod 32 is operatively connected with the tie rod B by an angular hinge plate 42 which includes hinge leaves 43 and 44 having hinged connection as at 45 with each other and hinged connection at their free ends as at 46 and 47 with clamping sections 48 and 49, the former being secured to the connecting rod by the engagement of the hooked terminal 50 thereover and the set screws 51 which pass therethrough. The clamping section 49 is attached to the tie rod B by a clamping plate 52 through the medium of the bolts 53. This form of connection between the tie rod and connecting rod compensates for relative longitudinal or vertical movements therebetween while connecting the same for simultaneous lateral shifting movements.

The operation is as follows: When the tie rod B is shifted to effect the turning of the steering knuckle arms C for turning the steering wheels, the connecting rod 32 will be simultaneously shifted therewith to turn the shafts 29 and the heads 15 within which the lamp bracket shanks 19 are secured. This will effect the turning of the lamps with the steering wheels to illuminate the road immediately in advance of the vehicle when making a turn.

In the modified form of the invention illustrated in Figs. 4, 5 and 6, the tie rod B is connected in precisely the same manner as in the first form to the connecting rod 32 in which instance said connecting rod includes precisely the same arms 35. In this form, however, the mounting of the shafts 29 and the lamps D have been modified. The modified form of mounting consists in providing stationary or rigid bracket arms 55 which are secured as at 56 at one extremity to the mud guards E and project inwardly therefrom. The inner end of the bracket arms are formed with bearing openings 57 through which the upper ends 58 of the shafts 29 extends. At a point below the bracket arms 55 the shafts 29 are exteriorly threaded as at 59 and have threadedly engaged thereon a nut 60 provided with a recess 61 at the upper end. A coiled spring 62 when interposed between the nut 60 and the under side of the arm, surrounding the shaft and lying within the recess 61. The portion of the upper end of the shaft 58 immediately above the bearing arm 55 is squared as at 63 to enter a squared opening 64 in the lamp bracket 65. A reduced threaded extremity 66 projects upwardly beyond the squared portion 63 and has threaded thereon a binding nut 67 which clamps the lamp bracket 65 in place on the squared portion 63. The shafts 29 have an additional bearing in the brackets 68 which are secured to the chassis frame rails F.

In use and operation the construction set forth in the modified adaptation of the invention is precisely the same as that of the first form and therefore has been omitted.

I claim:

1. A dirigible mounting for the headlights of an automobile comprising bearing brackets attached to the body of the vehicle, heads swiveled in the bearing brackets having the lamps attached thereto, depending shafts from the heads each having a radial arm at its lower end, a connecting rod between said radial arms, a connection between said connecting rod and the tie rod of the steering gear, said connection consisting of a pair of hingedly connected leaves, and clamping elements hingedly connected at the free ends of the leaves and secured respectively to the connecting rod and tie rod.

2. A dirigible mounting for the headlights of an automobile comprising stationary bearing elements attached to the vehicle body, vertical shafts extending from said bearing elements and swiveled therein for turning movement, lamps carried by and rotatable with the shafts, a radially disposed arm at the lower end of each shaft, a connecting rod having angularly adjustable arms at its opposite ends respectively connected at their outer ends to the outer ends of the corresponding shaft arms, and a connection between the connecting rod and tie rod of the steering gear, comprising a pair of hingedly connected leaves, and clamping elements hingedly connected to the free ends of the leaves and secured respectively to the connecting rod and tie rod.

CHARLES G. ROESCHER.